(12) United States Patent
Jürgensen et al.

(10) Patent No.: US 7,852,949 B2
(45) Date of Patent: Dec. 14, 2010

(54) SPECTRAL DISTANCE OPTIMIZING MULTI-BAND TRANSMISSION

(75) Inventors: Jens-Uwe Jürgensen, München (DE); Richard Stirling-Gallacher, Esslingen (DE)

(73) Assignee: Sony International (Europe) GmbH, Berlin (DE)

( * ) Notice: Subject to any disclaimer, the term of this patent is extended or adjusted under 35 U.S.C. 154(b) by 674 days.

(21) Appl. No.: 11/096,013

(22) Filed: Mar. 31, 2005

(65) Prior Publication Data
US 2005/0220216 A1 Oct. 6, 2005

(30) Foreign Application Priority Data
Apr. 2, 2004 (EP) ................... 04008066

(51) Int. Cl.
*H04B 14/04* (2006.01)
(52) U.S. Cl. ............ 375/242; 375/316; 375/135; 375/146; 375/260; 375/303; 375/272
(58) Field of Classification Search ........ 375/242, 375/316, 135, 146, 260, 303, 272; 370/208, 370/335; 455/127.1, 313, 323
See application file for complete search history.

(56) References Cited

U.S. PATENT DOCUMENTS

| 6,026,125 | A | 2/2000 | Larrick, Jr. et al. | |
|---|---|---|---|---|
| 6,448,926 | B1* | 9/2002 | Weinberg et al. | 342/357.06 |
| 7,058,037 | B1* | 6/2006 | Moon | 370/335 |
| 2003/0095609 | A1* | 5/2003 | Cowie et al. | 375/316 |
| 2004/0125740 | A1* | 7/2004 | Gardner | 370/208 |
| 2007/0190953 | A1* | 8/2007 | Tan Eng Choon et al. | 455/127.1 |

FOREIGN PATENT DOCUMENTS

WO WO 01/39451 5/2001

OTHER PUBLICATIONS

Saberinia E et al: "Multi-user UWB-OFDM communications" 2003 IEEE Pacific RIM Conference on Communications Computers and Signal Processing, vol. 1, Aug. 28, 2003, pp. 127-130, XP010661189.
"Revision of Part 15 of the Commission's Rules Regarding Ultra-Wideband Transmission Systems" Federal Communications Commission, First Report and Order, FCC 02-48, Apr. 22, 2002, 118 Pages.
Matt Welborn, "XtremeSpectrum CFP Presentation" Project: IEEE P802.15 Working Group for Wireless Personal Area Network (WPANs), doc.: IEEE 802.15-03/153r2, Mar. 2003, 28 pages.

(Continued)

*Primary Examiner*—Shuwang Liu
*Assistant Examiner*—Kabir A Timory
(74) *Attorney, Agent, or Firm*—Oblon, Spivak, McClelland, Maier & Neustadt, L.L.P.

(57) ABSTRACT

A communication system is provided which implements a method for up-converting a baseband signal to a given number of frequency bands that together define a signal transmission channel. A sequential order is defined in which the frequency bands are to be used for up-converting the baseband signal, and up-converting the baseband signal to one frequency band after the other in the defined sequential order such that the spectral distance between two frequency bands is equal or higher for the frequency bands being direct neighbors in the defined sequential order than being direct neighbors in the spectral order.

11 Claims, 11 Drawing Sheets

OTHER PUBLICATIONS

Ellis, et al. "P802.15.3a Alt PHY Selection Criteria" Wireless Personal Area Networks, IEEE P802.15-03/031r5, Dec. 27, 2002, 38 pages.

Roberto Aiello, "Discrete Time PHY Proposal for TG3a" Project: IEEE P802.15 Working Group for Wireless Personal Area Network (WPANs), doc.: IEEE 802.15-03/099r1, Mar. 2003, 39 pages.

Jeff Foerster, et al. "Intel CFP Presentation for UWB PHY" Project: IEEE P802.15 Working Group for Wireless Personal Area Network (WPANs), doc.: IEEE 802.15-03/109r1, Mar. 3, 2003, 53 pages.

Charles Razzel, et al. "Philips TG3a CFP Presentation" Project: IEEE P802.15 Working Group for Wireless Personal Area Network (WPANs), doc.: IEEE 802.15-03/125r2, Mar. 2, 2003, 33 pages.

Naiel Askar "General Atomics Call for Proposals Presentation" Project: IEEE P802.15 Working Group for Wireless Personal Area Network (WPANs), doc.: IEEE 802.15-03/105r1, Mar. 3, 2003, 42 pages.

* cited by examiner

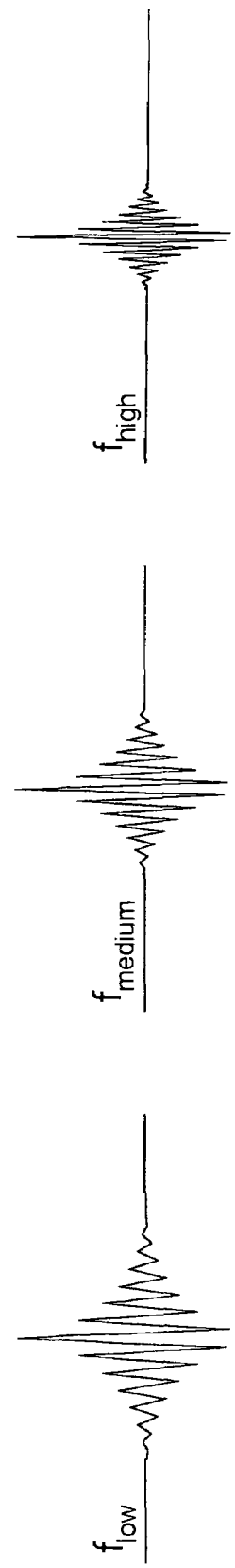

SPECTRAL DISTANCE OPTIMIZING MULTI-BAND TRANSMISSION

BACKGROUND

The present invention relates to multi-band communication systems and in particular to multi-band Ultra Wide-Band systems.

Recently, intense attention has focused on Ultra Wide-Band (UWB) systems, which can offer very high data rate of more than 110 Mbps over a short range of about up to 10 m for broadband wireless applications including wireless multimedia stream or wireless video connection. UWB systems are systems, which use extremely large bandwidths. In the past, such systems were only used in military applications. However in 2002, the Federal Communications Commission (FCC) in the US allowed the use of the 3.1-10.6 GHz band for commercial ultra-wideband applications. Furthermore, the FCC defined that an ultra-wideband signal must occupy at least 500 MHz bandwidth or have a fractional bandwidth greater than 0.25. To generate such large bandwidths of up to 7.5 GHz, various methods exist including short pulse, chirp modulation, frequency hopping and the like.

Typical pulse generated ultra-wideband systems transmit a short pulse followed by a gap with no transmission until the next pulse is sent. The rate at which the pulses including the subsequent time gap between pulses are sent is known as the pulse repetition frequency (PRF). If the pulses of such a UWB system occupy one very broad band (from 500 MHz up to 7.5 GHz), these systems are called Single-Band UWB Systems. If the pulses occupy several smaller bands of more than 500 MHz, these systems are called Multi-Band UWB systems.

The block diagram of FIG. 1 shows an example for a multi-band UWB transmitter. An impulse generator provides impulses to a pulse shaping filter, which is e.g. implemented using a low-pass or band-pass filters. The output of a pulse-shaping filter is a pulse shaped impulse signal. The mixer up-converts the pulse shaped impulse signal to the desired operating centre frequency. The bandwidth of the UWB signal at the output of the mixer is determined by the bandwidth of the pulse-shaping filter. The centre frequency as well as the instantaneous phase of the UWB signal can be controlled via oscillator control. A RF band-pass filter is used at the output of the mixer to reject undesirable or out-of-band frequencies and/or mixer products prior to a transmission via an antenna. A more detailed description of an UWB transmitter is e.g. given in U.S. Pat. No. 6,026,125.

The adjustable centre frequency of the oscillator depicted in FIG. 1 enables multi-band UWB system with frequency hopping. Frequency hopping patterns for multi-band UWB system have been proposed by Discrete Time in "Discrete Time PHY Proposal for TG3a, IEEEE802.15-03/099r1, March 2003", Intel in "IntelCFP Presentation for a UWB PHY, IEEE802.15-03/109r1, Mar. $3^{rd}$ 2003", Philips in "Philips TG3a CFP Presentation, IEEE802.15-03/125r2, Mar. $2^{nd}$ 2003", and General Atomics in "General Atomics Call for Proposal Presentation, IEEE802.15-03/105r1, March $3^{rd}$ 2003" as part of the contributions for a UWB PHY to be developed in IEEE 802.15-3a. Whereas Intel and Discrete Time propose using hopping patterns to avoid persistent collision of co-located un-coordinated piconets (network of devices connected in an ad hoc fashion using Bluetooth technology) by using the pattern to differentiate the piconets, Philips and General Atomics propose using hopping patterns as information bearing signal, i.e. the pattern itself is used to encode data.

An example for the impulse response of the pulse-shaping filter in FIG. 1 is a Gaussian window. Mathematically the Gaussian window w(t) is defined as:

$$w(t) = e^{-\frac{t^2}{2\sigma^2}} \quad (1)$$

with t=0 being the centre of the pulse window and σ the standard deviation.

To prepare a baseband signal for a transmission over a defined frequency band, the baseband signal is usually multiplied with a sine wave of the centre frequency of the frequency band. In multi-band UWB system the sine wave is multiplied with a Gaussian window to result a pulse on the respective frequency band. This mixing is mathematically described by:

$$x(t) = s(t) \cdot w(t)$$

whereby s(t)=sin (2πft) and $$w(t) = e^{-\frac{t^2}{2\sigma^2}}.$$

x(t) is the signal at the output of the mixer, s(t) is the sine wave and w(t) is the same Gaussian window as in equation (1). In case of fixed bandwidth the standard deviation σ of the Gaussian window is the same for all frequencies f. In FIG. 2 three pulses with different centre frequencies $f_{low}$, $f_{medium}$, and $f_{high}$ are shown. These pulses can be observed between the mixer and the band-pass filter of FIG. 1. Since all of the three pulses have the same duration, all of them are occupying the same bandwidth at different frequencies. Those pulses with equal length are used in a system with sub-bands of a fixed bandwidth.

Since the number of cycles per pulse is different for each pulse, the auto-correlation properties of the three pulses are different. FIG. 3 shows the spectrum of a multi-band UWB system with seven sub-bands of a fixed bandwidth. As can bee seen, the roll off and the bandwidth of all sub-bands are the same.

FIG. 4 shows a typical staggering of frequency sub-bands defined for a multi-band UWB system. Only one sub-band is used at a time and by a pulse with the respective centre frequency. In the example shown, a frame consists of seven pulses with each pulse transmitted in the next higher sub-band to that of the previous one. Strictly speaking, the first pulse of a frame is transmitted over the sub-band '1' with the centre frequency $f_1$, the second over the sub-band '2' with the centre frequency $f_2$, and so on until finally the seventh and last pulse of the frame is transmitted over the sub-band '7' with the centre frequency $f_7$. The order by which the pulses are sent over the respective sub-bands is referred to as pulse transmission order. In the example shown it is defined as (1, 2, 3, 4, 5, 6, 7). In a more general definition, the pulse transmission order corresponds to a definition of a sequential order in which the frequency bands defining the signal transmission channel are to be used for up-converting a baseband signal.

This pulse transmission order has a detrimental effect on the adjacent channel interference. The adjacent channel interference results from spectral overlapping of the pulse frequencies, as depicted in FIG. 3, and the multipath characteristic of a typical radio channel. As can be seen, the spectra of pulses with adjacent centre frequencies overlap and this overlapping results in adjacent channel interference if the pulses are received at the same time. This will occur even if each pulse is sent at a different time because the pulses are delay-spread by the multipath of a mobile radio channel. The effect of delay-spread is illustrated in FIG. 5. The transmitted pulse reaches the receiver via several paths with different delays and attenuations due to reflections and shadowing effects. The resulting signal at the receiver consists of multiple copies of the originally transmitted pulse but each copy with a different time delay, phase and amplitude. A respective received signal is shown on the right hand side of FIG. 5.

The adjacent channel interference resulting from a corresponding multipath propagation of the pulses is illustrated in FIG. 6. The centre frequencies of the pulses shown in FIG. 6 are assumed to be those indicated in FIG. 3. The grey shaded areas show the time periods, where pulses with adjacent centre frequencies interfere with each other at the receiver. The shown is of particular relevance for multipath channels which have a delay spread of the same order than the pulse repetition frequency (PRF). What has been described with reference to a multi-band UWB system applies quite in general also to any frequency hopping multi-band system.

SUMMARY

It is therefore an object of the present invention to provide a frequency hopping multi-band system with reduced signal interference.

This object is achieved by a method for up-converting a baseband signal to a given number of frequency bands which together define a signal transmission channel, whereby the method comprises a step for defining a sequential order in which the frequency bands are to be used for up-converting the baseband signal, and a step for up-converting the baseband signal to one frequency band after the other in the defined sequential order such that the spectral distance between two frequency bands is equal or higher for the frequency bands being direct neighbours in the defined sequential order than for frequency bands being direct neighbours in the spectral order.

The above object is further achieved by a multi-band signal transmitter for transmitting a baseband signal over a given number of frequency bands which together define a signal transmission channel, the multi-band transmitter having a baseband circuit for providing a baseband signal, a transmission frequency control means for providing the centre frequencies of the frequency bands defining the signal transmission channel, and an up-converter means for up-converting the baseband signal to one frequency band after the other in a defined sequential order, whereby the transmission frequency control means contains a sequential order definition means defining the sequential order according to a method of the present invention.

A multi-band communication systems utilising a respective method and/or multi-band signal transmitter advantageously enables a staggering of the transmission signals in time such, that signals transmitted over adjacent frequency bands, i.e. frequency bands being direct neighbours in the spectral order, are separated by at least a time interval required for a transmission over one frequency band. Thus, adjacent-channel interference due to overlapping of frequency bands and/or multipath transmission is reduced considerably.

Further developments are set forth in the dependent claims.

In a preferred embodiment of the present invention, the baseband signal is formed by a pulse signal for a multi-band Wide-Band transmission system with significantly reduced adjacent channel interference.

For utilising the full transmission power provided by a frequency band, the bandwidth of a current baseband signal favourably corresponds to the bandwidth defined for the frequency band to which it is to be up-converted. The baseband circuit of the multi-band signal transmitter hereto preferably comprises a bandwidth adaptation means for adapting the bandwidth of a baseband signal to the bandwidth of the frequency band currently used for up-converting.

When using a baseband signal of fixed bandwidth, the bandwidth of any two frequency bands defining the signal transmission channel are substantially identical. For a broadly frequency independent pathloss, the bandwidths of the frequency bands defining the signal transmission channel are effectively defined such, that the fractional bandwidths, i.e. the bandwidths normalised to the centre frequency of the respective frequency band, of any two of the frequency bands are substantially identical.

The adjacent-channel interference is the lowest for the spectral distance of two consecutive frequency bands being the highest. The sequential order is therefore advantageously defined as a first sequence of the frequency bands such, that the average spectral distance between the centre frequencies of each two direct consecutively arranged frequency bands in the sequence is the maximum possible. And, if more than one sequence arrangement yields the maximum possible average spectral distance, the sequence arrangement with the lowest standard deviation of spectral distances of consecutive frequency bands forms the first sequence of frequency bands.

For being able to operate co-located piconets substantially free of persistent collisions, each piconet uses a sequential order different to that of the other. For this, one or more further sequences of frequency bands for use as a sequential order of frequency bands are suitably defined, whereby each further sequence has an equal or higher standard deviation and/or an equal or lower average spectral distance as compared to the first sequence of frequency bands.

To allow a dynamic adaptation of a piconet to its surrounding, the definition of a sequential order corresponds to a particular sequence of the defined first and further sequences of frequency bands only for a given period of time, and corresponds to a different sequence of the defined first and further sequences of frequency bands upon expiration of the time period.

In the following description, the present invention is explained in more detail with respect to special embodiments and in relation to the enclosed drawings, in which

BRIEF DESCRIPTION OF SEVERAL VIEWS OF THE DRAWINGS

FIG. 8 is a table indicating the spectral distances between sub-band frequencies according to the frequency hopping pattern of FIG. 6, FIG. 9 is a table indicating the spectral distances between sub-band frequencies according to the frequency hopping pattern of FIG. 7, FIG. 12 shows pulses with different centre frequencies but identical fractional bandwidth.

DETAILED DESCRIPTION

Figure 1:
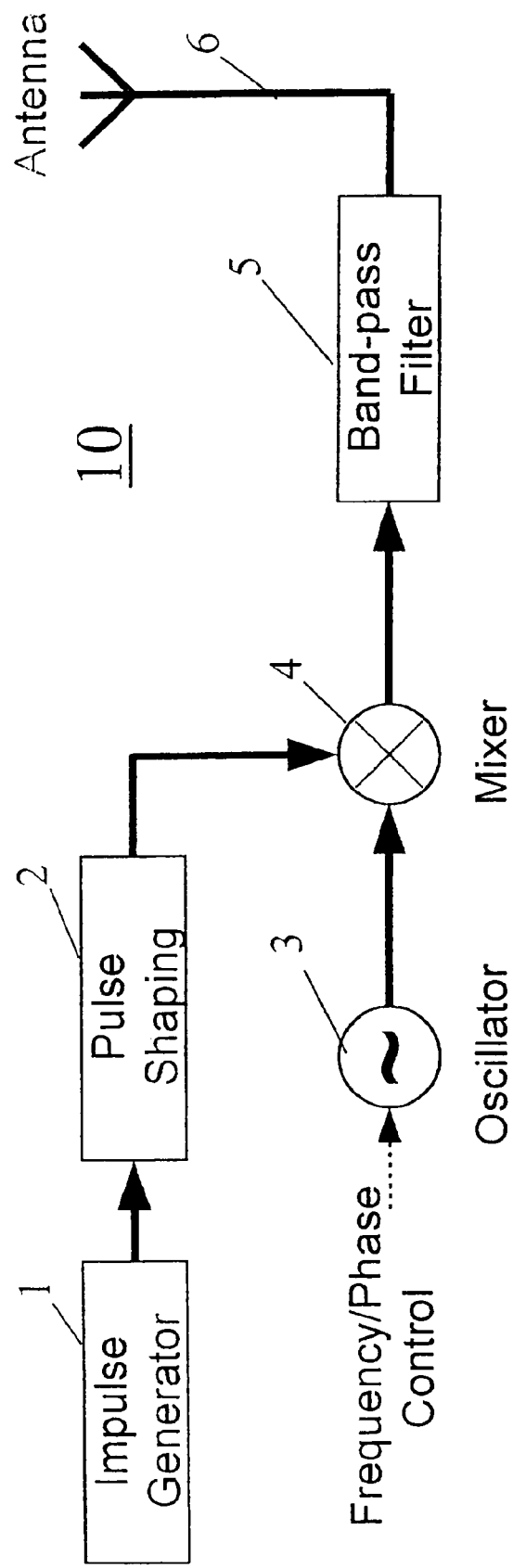
FIG. 1 is a block diagram of a multi-band UWB transmitter.
Figure 2:
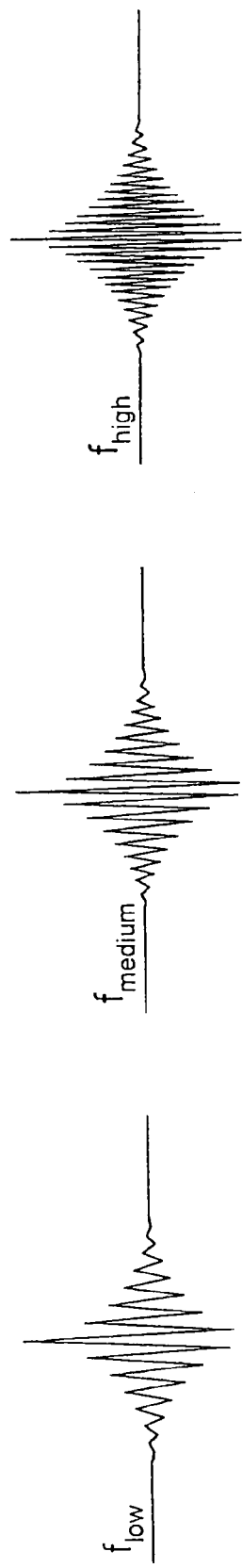
FIG. 2 shows pulses with identical bandwidth but different centre frequencies.

The principle components of a UWB system 10 are shown in FIG. 1. The system comprises a baseband circuit with an impulse generator 1 and a pulse shaping filter 2, a frequency and phase controlled RF-frequency oscillator 3, a mixer 4 for up-converting the baseband signal to the respective radio frequency of the oscillator, a RF-band-pass filter 5 for rejecting undesirable or out-of-band frequencies and mixer products, and an antenna 6 for transmitting the modulated RF-signal. Although FIG. 1 refers to a UWB system, the invention is applicable to all frequency hopping multi-band systems since those only use a different baseband circuit.

Figure 4:
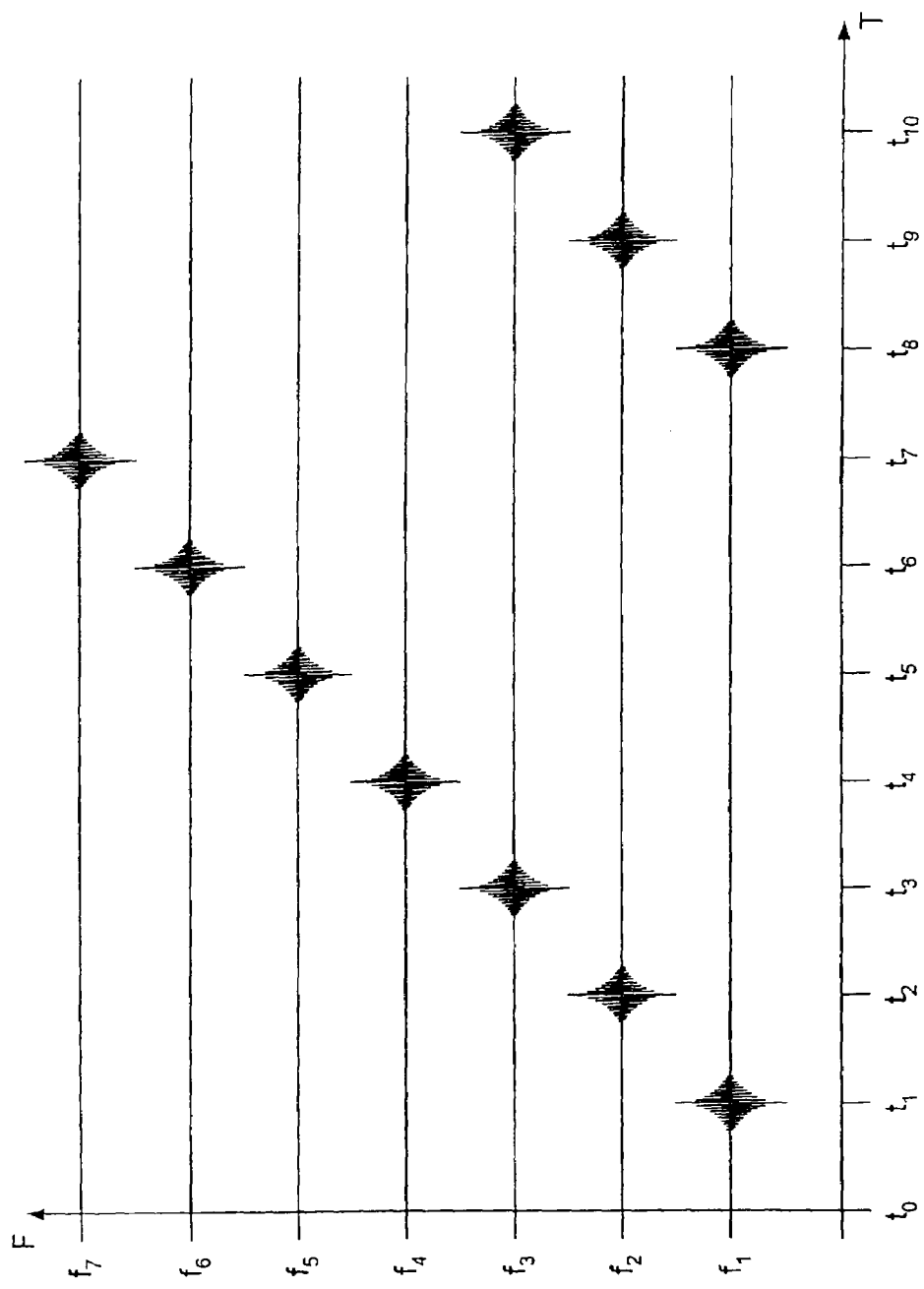
FIG. 4 shows a pulse staggering according to the state of the art for a multi-band UWB system.
Figure 5:
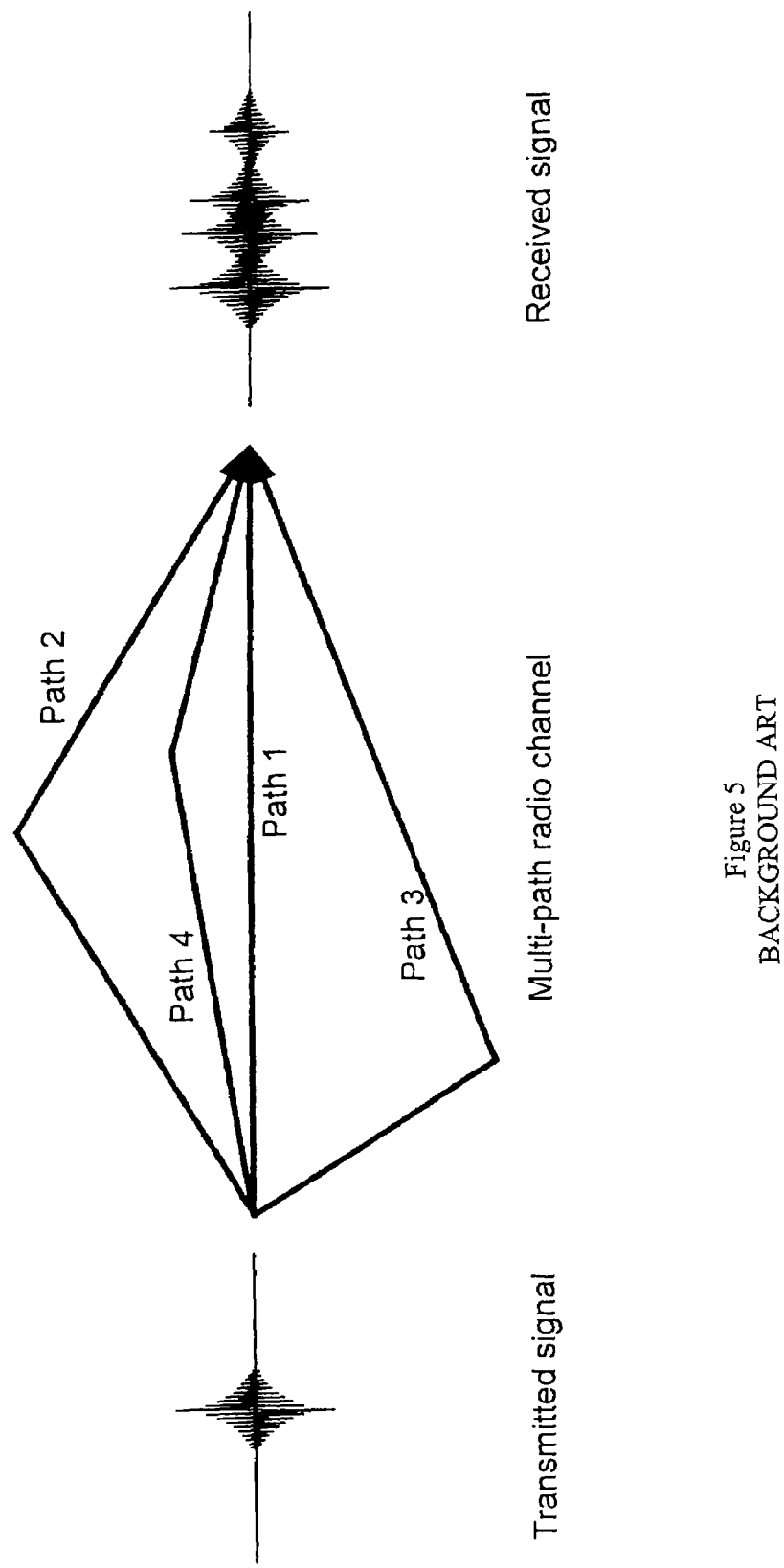
FIG. 5 shows the delay-spread of a pulse due to multipath radio channel transmission.
Figure 6:
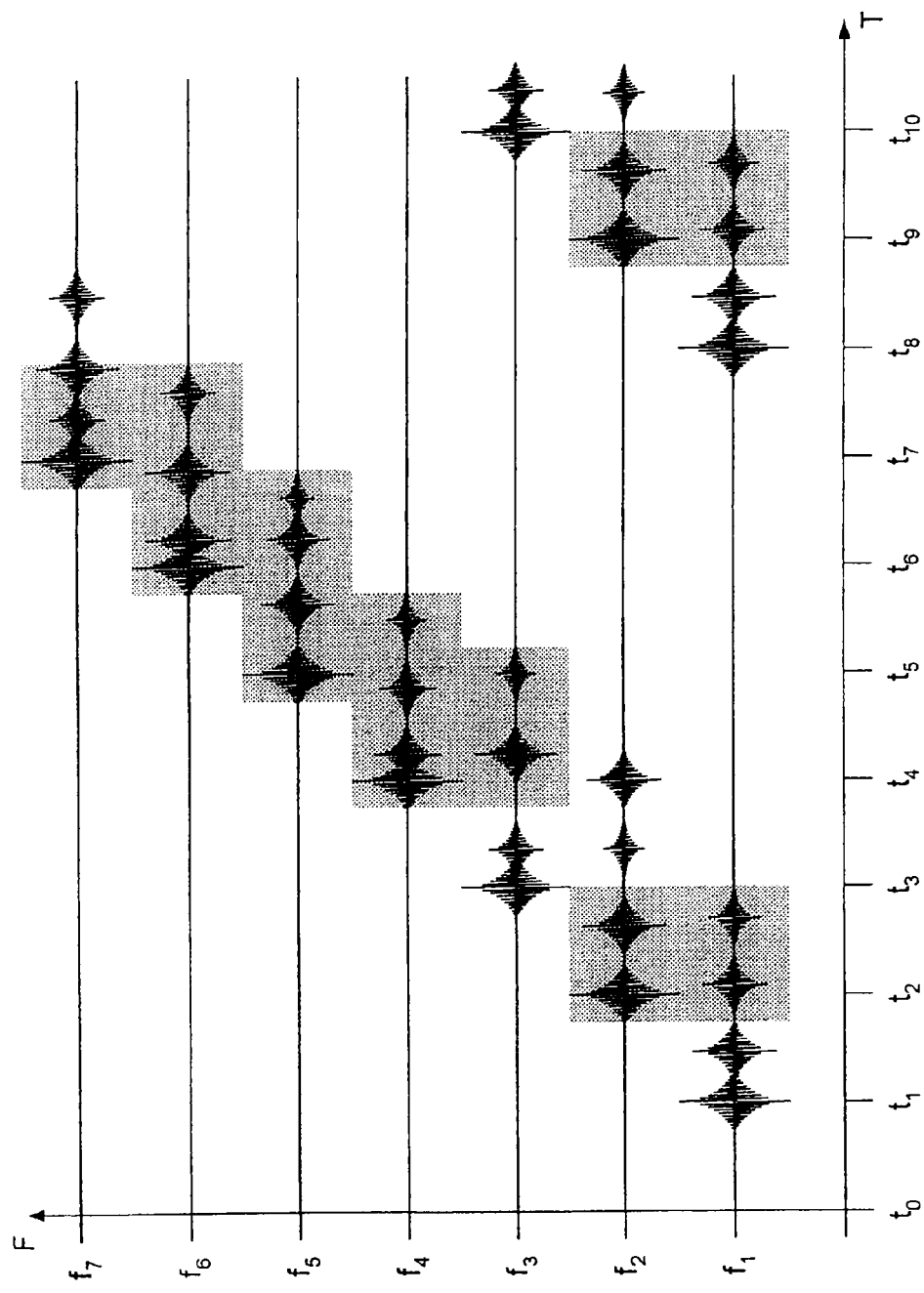
FIG. 6 shows the adjacent-channel interference for a state of the art frequency hopping sequence (1, 2, 3, 4, 5, 6, 7)
Figure 7:
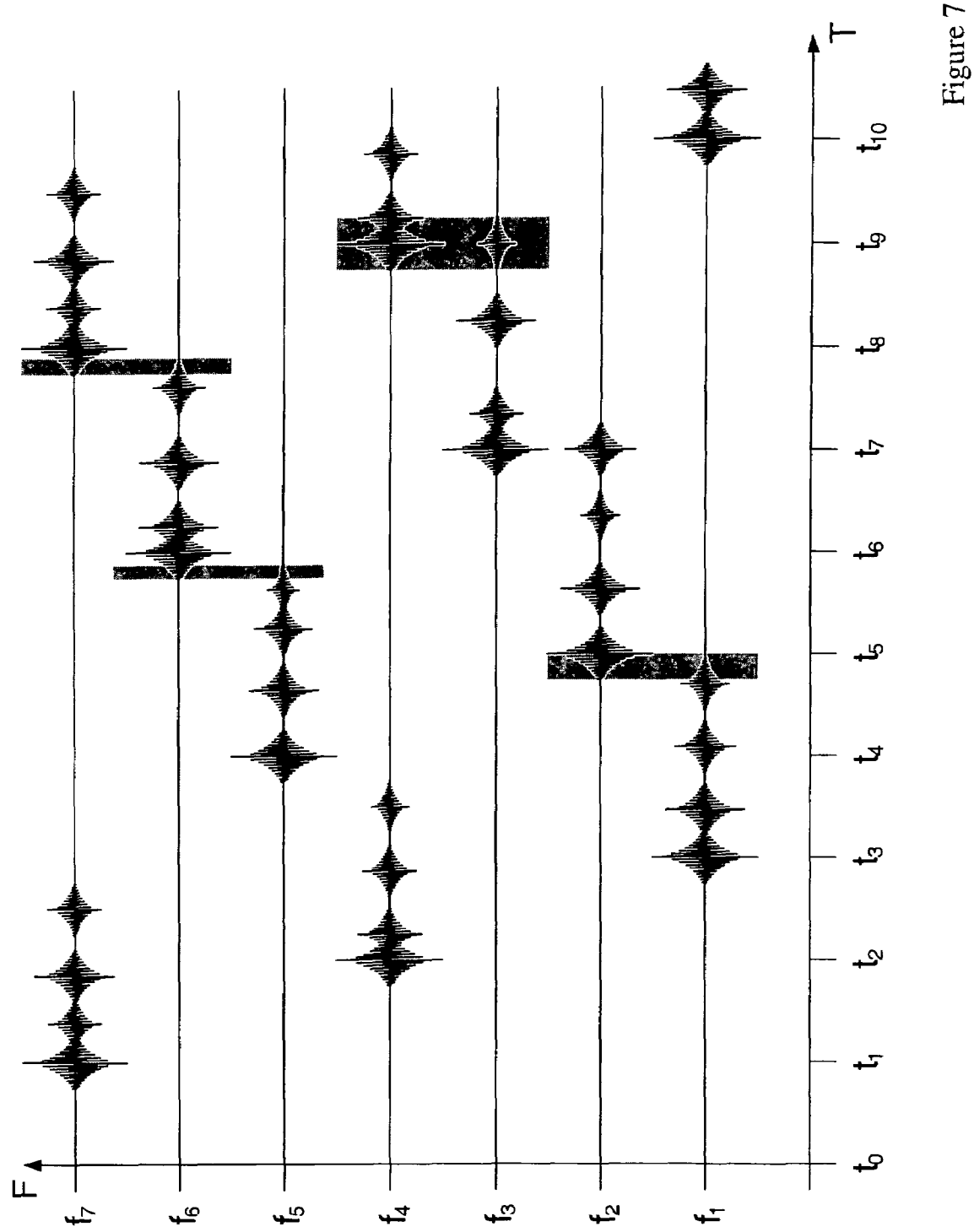
FIG. 7 shows the adjacent-channel interference for a frequency hopping sequence (7, 4, 1, 5, 2, 6, 3) according to the present invention.

Unlike the pulse transmission order used in the state of the art UWB systems as described with respect to FIG. 4, the present invention reduces adjacent-channel interference by a changed sequential order according to which the baseband signals are up-converted to the respective frequency bands. An example is shown in FIG. 7, for which the same multipath transmission conditions are assumed than for FIG. 6. The changed sequential order leads to reduced adjacent-channel interference as indicated by the fewer grey shaded areas as compared to FIG. 6.

Figure 3:
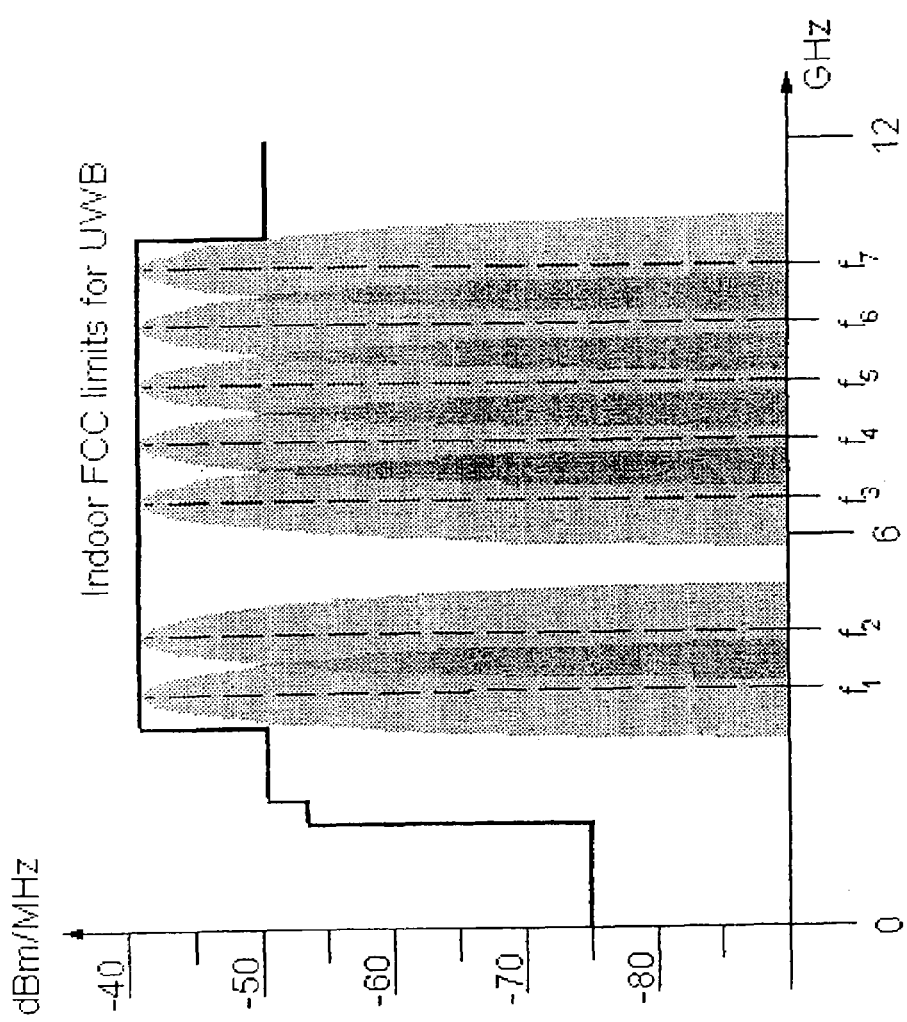
FIG. 3 shows a spectrum of a 7-band UWB system with sub-bands of fixed bandwidth.

An optimum pulse transmission order can be determined from a listing of the spectral distances of all frequency bands defined within a given signal transmission channel. The spectral distances for a signal transmission channel according to FIG. 3 are listed in the tables of FIGS. 8 and 9, respectively. The centre frequencies of individual frequency bands are then $f_1=3.6$ GHz, $f_2=4.6$ GHz, $f_3=6.4$ GHz, $f_4=7.3$ GHz, $f_5=8.3$ GHz, $f_6=9.2$ GHz, and $f_7=10.1$ GHz. The spectral distances of each frequency band to each of the respective other frequency bands are listed in the table of FIG. 8, wherein the numbers give the spectral distances in GHz. As can be seen, the spectral distance between a pulse with centre frequency $f_3$ and a pulse with centre frequency $f_6$ is equal to 2.8 GHz.

A state-of-the-art pulse transmission order (1, 2, 3, 4, 5, 6, 7) results in a sequential order of the spectral distances between consecutive pulses of (1.0 GHz, 1.8 GHz, 0.9 GHz, 1.0 GHz, 0.9 GHz, 0.9 GHz, 6.5 GHz). These Values are indicated by circles in FIG. 8. The last number 6.5 GHz is the distance between the pulse with the centre frequency $f_7$ at the end of a frame and the first pulse of the next frame having the centre frequency $f_1$. The mean of these spectral distances is equal to 1.86 GHz and the standard deviation between the centre frequencies of consecutive pulses is equal to 2.07 GHz.

A pulse transmission order of (7, 4, 1, 5, 2, 6, 3) shows a sequential order of spectral distances corresponding to (2.8 GHz, 3.7 GHz, 4.7 GHz, 3.7 GHz, 4.6 GHz, 2.8 GHz, 3.7 GHz). The circles in FIG. 9 indicate the respective values. The mean of the corresponding spectral distances is equal to 3.71 GHz and the standard deviation is equal to 0.76 GHz.

The optimum pulse transmission order is given by the sequential order of frequency bands that results the maximum possible means of the corresponding spectral distances. For every sequence of frequency bands of the signal transmission channel used for up-converting the baseband signal, the mean or average, respectively, of the resulting spectral distances is formed and compared to that of the other possible sequences. The sequence resulting the highest average spectral distance represents the optimum pulse transmission order. The higher average spectral distance value offers a better adjacent-channel interference reduction due to the fact that consecutive pulses have in average a higher spectral distance.

If two or more pulse transmission orders have the same maximum average value of spectral distances, the order with the lowest standard deviation value of the spectral distances forms the optimum pulse transmission order. It offers the minimum adjacent-channel interference.

If two co-located piconets use a UWB system for communication according to the present invention, collisions between the two communication systems may occur. By defining different pulse transmission orders for each piconet, a data transmission collision is avoided because each piconet communicates at a given time on a different sub-band frequency although both use the full signal transmission channel, which is identical for the two. An alternative pulse transmission order is therefore determined for the optimum pulse transmission order or for a number of transmission orders with a sufficiently high average spectral distance and a low enough standard deviation. Other piconets would use an alternative sequential order.

The exact details of particular multipath signal interference are mainly determined by the attenuation and reflection behaviour of all objects contributing to the multipath for signal transmission. Usually this is not a constant and may be affected by objects, like e.g. persons or cars moving in and out of the transmission zone. In some instances, the optimum pulse transmission order may not be the best, as it may be disadvantageous for a particular multipath transmission condition. The sequence of pulse transmission orders is either predetermined or may be indicated in the preamble of a transmitted frame.

Figure 10:
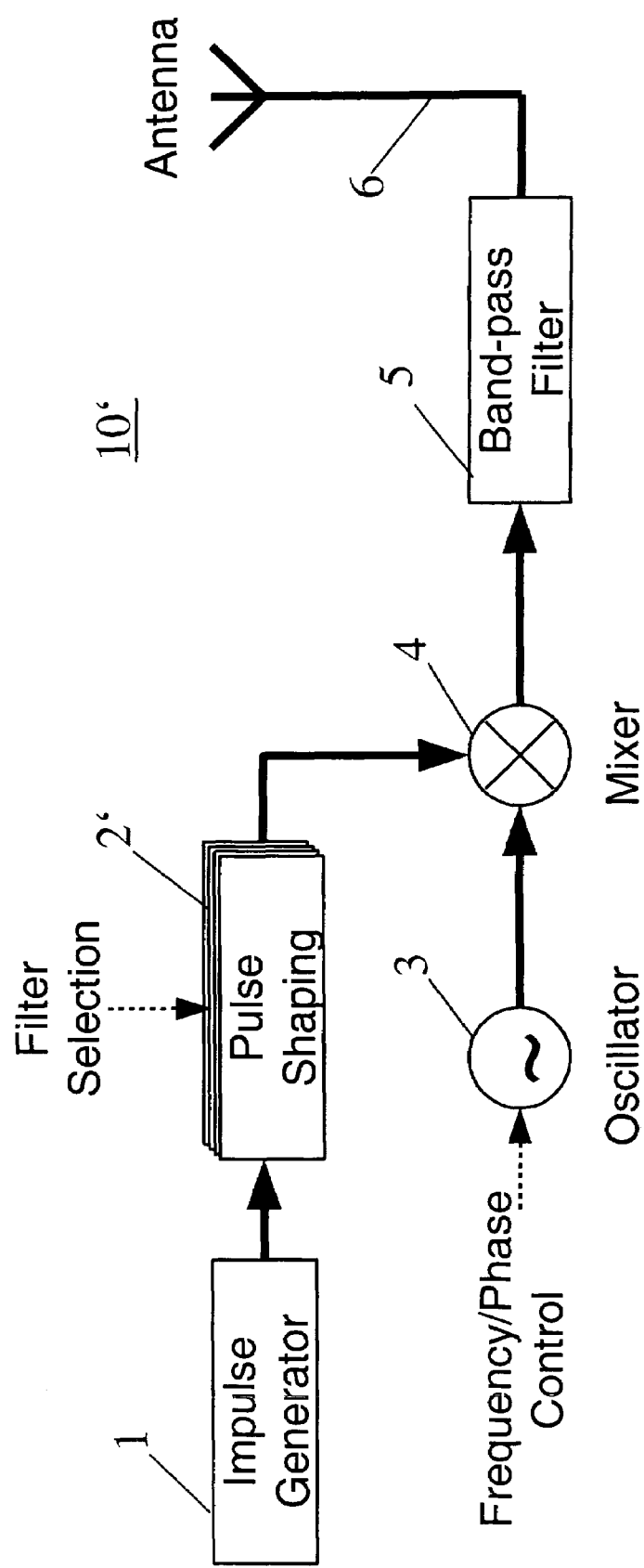
FIG. 10 is a block diagram of a multi-band UWB transmitter according to a second embodiment of the present invention.
Figure 11:
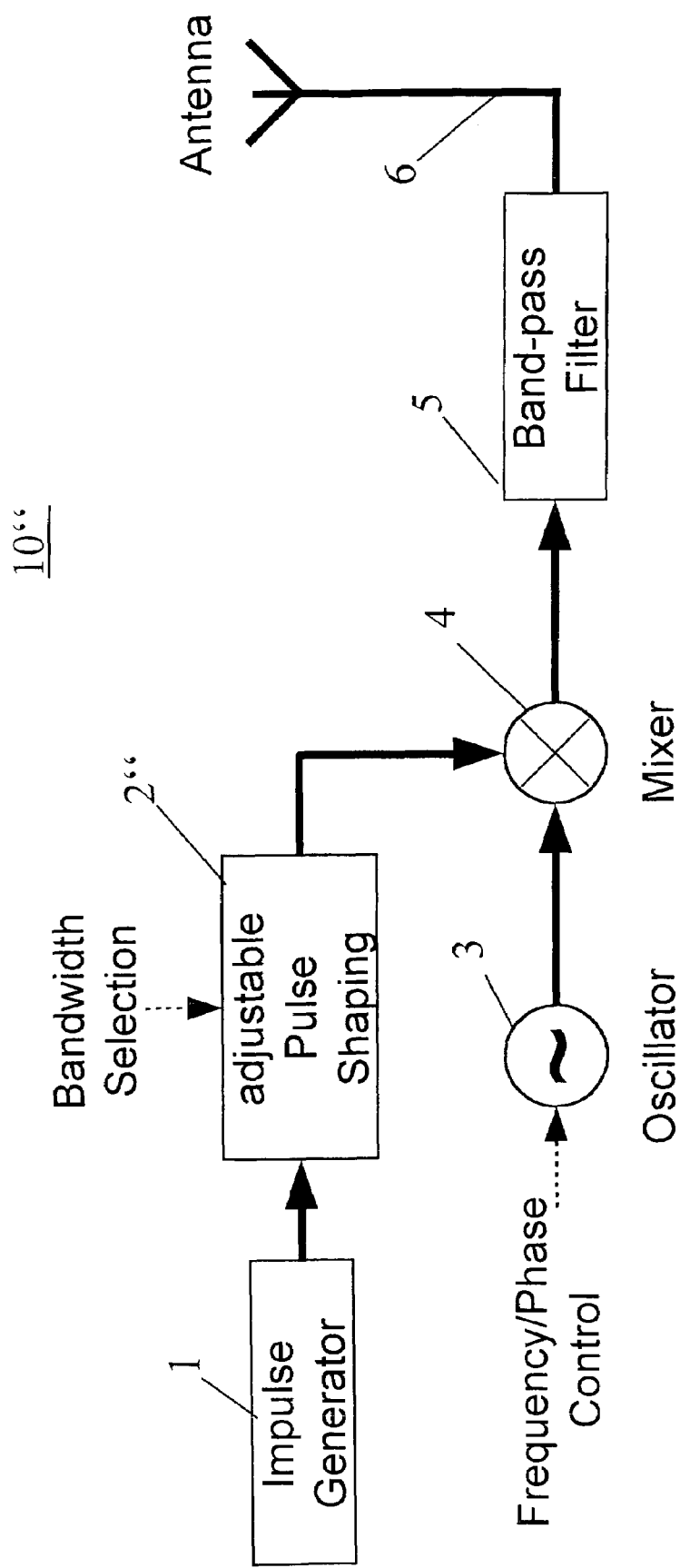
FIG. 11 is a block diagram of a multi-band UWB transmitter according to a third embodiment of the present invention.

A further reduction of transmission interferences can be achieved by adjusting the bandwidth of each signal transmission channel frequency band relative to its centre frequency. This requires a special design of the pulse shaping unit 2. The pulse shaping filter may be made up of a bank 2' of single pulse shaping filters like shown in FIG. 10, but may also be implemented in form of a single adjustable pulse shaping filter 2" as shown in FIG. 11 by which the bandwidth of each current baseband pulse is adjusted to the bandwidth of the respective frequency band it is destined to be up-converted.

The bandwidth of the sub-bands is preferably increased with their centre frequency such, that the fractional bandwidth is constant for each frequency band or sub-band of the signal transmission channel, respectively. A fractional bandwidth is defined as the bandwidth of a signal or frequency band divided by its respective centre frequency. The defining equation as proposed by the FCC (Federal Communication Commission), see hereto Federal Communication Commissions "Revision of Part 15 of the Commission's Rules Regarding Ultra-Wireband Transmission Systems", First Report and Order, ET Docket 98-153; Apr. $22^{nd}$, 2002, is given by:

$$b_f = 2 \cdot \frac{f_H - f_L}{f_H + f_L}, \quad (3)$$

wherein $f_H$ stands for the upper and $f_L$ for the lower frequency of the sub-band occupied by the transmission signal.

Keeping the fractional bandwidth of the sub-bands of a signal transmission channel constant results in a higher bandwidth for frequency bands with higher centre frequency. By adjusting the bandwidth of the baseband signal to the bandwidth of the sub-band it is going to be up-converted, the autocorrelation properties of the transmitted signal do not change while hopping from sub-band to sub-band. This is illustrated for a UWB system pulse in FIG. 12, where three pulses up-converted on three different centre frequencies are shown. Since all of the three pulses consist of the same amount of cycles per pulse, they own the same autocorrelation properties. The pulses shown are derived like explained above with respect to the state of the art by multiplying a sine wave with a shaped baseband pulse which is mathematically described in equation (2). In case of a fixed bandwidth, the standard deviation σ of the Gaussian window decreases linear with an increasing centre frequency defined by the sine wave.

Figure 13:
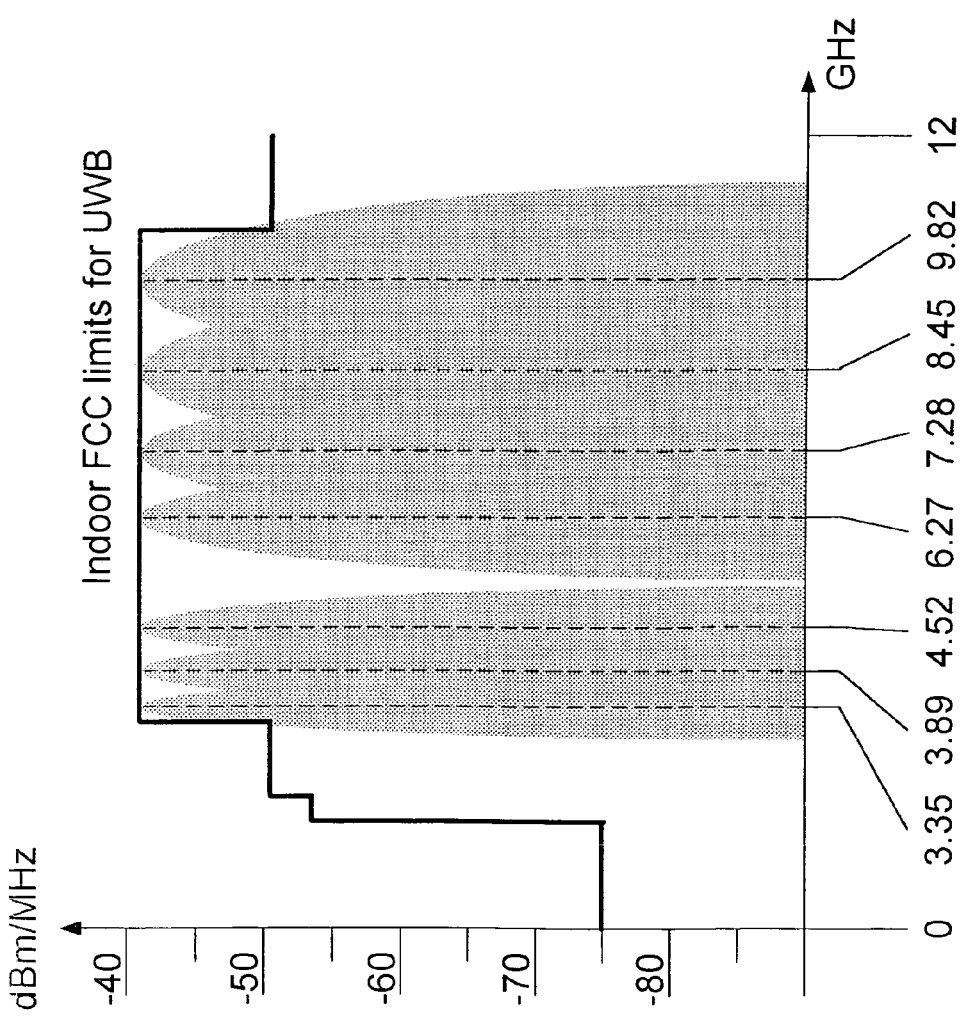
FIG. 13 shows the spectrum of a 7-band UWB system with sub-bands of fixed fractional bandwidths.

The spectrum of a multi-band UWB system with frequency bands of fixed fractional bandwidth is shown in FIG. 13. As can bee seen, the roll off, i.e. the cut-off steepness of a frequency band, is faster for the sub-bands with lower centre frequencies and smaller bandwidth, than for those with higher centre frequencies and higher bandwidths.

A wider bandwidth represents a provision of more transmission power. Since the pathloss of a transmission increases with higher transmission frequencies, a provision of more transmission power for sub-bands with higher centre frequencies compensates the frequency band dependence of the pathloss to a certain degree. The pathloss for an UWB system at 3.1 GHz to 10.6 GHz is defined by the following equation as proposed in Ellis, Siwiak, Roberts "P802.15.3a Alt PHY Selection Criteria", IEEE 802.1-0 3/031r5; Dec. 27$^{th}$ 2002:

$$\text{pathloss} = 20 \cdot \log_{10}\left(\frac{4\pi d f_c}{c}\right), \quad (4)$$

wherein d is the distance between transmitter and receiver, $f_c$ the centre frequency of the sub-band and c the speed of light.

By defining the sub-bands of a signal transmission channel as frequency bands of constant fractional bandwidth, the signal transmission power is substantially independent of the sub-band used for the transmission, i.e. a substantially constant overall transmission power is achieved which further improves the resistivity of the proposed system against interferences.

Although the invention has been described with emphasis to a UWB system, it is applicable to any multi-band system since the representation form of a baseband signal is not critical for the working of the proposed system. Instead of a shaped pulse any baseband signal suited for a multi-band transmission may therefore be used instead.

The invention claimed is:

1. A method of up-converting a baseband signal to a given number of frequency bands, the method comprising defining a temporal order in which the frequency bands are to be used for up-converting the baseband signal, the frequency bands having a spectral order defining a signal transmission channel; and up-converting the baseband signal to the respective frequency band in the defined temporal order, wherein the spectral distance between two frequency bands is equal or higher for the frequency bands which are direct neighbors in the defined temporal order than for frequency bands which are direct neighbors in the spectral order, and wherein the temporal order is defined by, for each frequency band, selecting a subsequent frequency band based on which of the frequency bands satisfies a condition that an average spectral distance between center frequencies of any two direct consecutively arranged frequency bands in the temporal order is maximum.

2. The method according to claim 1, wherein the baseband signal is formed by a pulse signal for a multi-band Wide-Band transmission system.

3. The method according to claim 1, wherein bandwidth of a current baseband signal corresponds to bandwidth defined for the up-converted frequency band.

4. The method according to claim 1, wherein bandwidths of any two frequency bands defining the signal transmission channel are substantially identical.

5. The method according to claim 1, wherein fractional bandwidths of any two frequency bands defining the signal transmission channel are substantially identical.

6. The method according to claim 1, wherein when more than one sequence arrangement yields the maximum average spectral distance, the sequence arrangement with the lowest standard deviation of spectral distances of consecutive frequency bands is used in the defining of the temporal order of the frequency bands.

7. The method according to claim 1, further comprising:
defining one or more further sequences of frequency bands for use as a second temporal order of frequency bands, whereby each further sequence has an equal or higher standard deviation and/or an equal or lower average spectral distance as compared to a first sequence corresponding to the temporal order of the frequency bands.

8. The method according to claim 7, wherein one of the temporal order and the second temporal order is used only for a given period of time, and a remaining one of the temporal order and the second temporal order is used upon expiration of the time period.

9. A multi-band signal transmitter for transmitting a baseband signal over a given number of frequency bands, the transmitter comprising:

a baseband circuit for providing said baseband signal, a transmission frequency control means for providing center frequencies of the given number of frequency bands which together define a signal transmission channel, the number of frequency bands having a spectral order; and an up-converter means for up-converting the baseband signal to the respective frequency band in a defined temporal order, wherein the transmission frequency control means contains a temporal order definition means for defining the temporal order by, for each frequency band, selecting a subsequent frequency band based on which of the frequency bands satisfies a condition that an average spectral distance between center frequencies of any two direct consecutively arranged frequency bands in the temporal order is maximum.

10. The multi-band signal transmitter according to claim 9, wherein the baseband circuit comprises a bandwidth adaptation means for adapting bandwidth of a baseband signal to bandwidth of the frequency band currently used for up-converting.

11. A multi-band signal transmitter for transmitting a baseband signal over a given number of frequency bands, the transmitter comprising:

a baseband circuit for providing said baseband signal, a transmission frequency control unit configured to provide center frequencies of the given number of frequency bands which together define a signal transmission channel, the number of frequency bands having a spectral order; and an up-converter unit configured to up-convert the baseband signal to the respective frequency band in a defined temporal order, wherein the transmission frequency control unit contains a temporal order definition unit configured to define the temporal order by, for each frequency band, selecting a subsequent frequency band based on which of the frequency bands satisfies a condition that an average spectral distance between center frequencies of any two direct consecutively arranged frequency bands in the temporal order is maximum.

* * * * *

UNITED STATES PATENT AND TRADEMARK OFFICE
CERTIFICATE OF CORRECTION

| | | |
|---|---|---|
| PATENT NO. | : 7,852,949 B2 | Page 1 of 1 |
| APPLICATION NO. | : 11/096013 | |
| DATED | : December 14, 2010 | |
| INVENTOR(S) | : Jens-Uwe Jurgensen et al. | |

It is certified that error appears in the above-identified patent and that said Letters Patent is hereby corrected as shown below:

On the title page, Items (54) and Column 1, the Title is incorrect. Items (54) and Column 1 should read:

-- SPECTRAL DISTANCE OPTIMIZED
       MULTI-BAND TRANSMISSION --

Title page Item (73), the Assignee is incorrect. It should read:

Item -- (73) Assignee: Sony Deutschland GmbH, Koeln (DE) --

Signed and Sealed this

Seventeenth Day of May, 2011

David J. Kappos
*Director of the United States Patent and Trademark Office*